July 21, 1936.   A. G. HEWITT   2,048,447
PACKAGED MEAT CUT AND A METHOD OF PREPARING IT
Filed Jan. 15, 1934   2 Sheets-Sheet 1
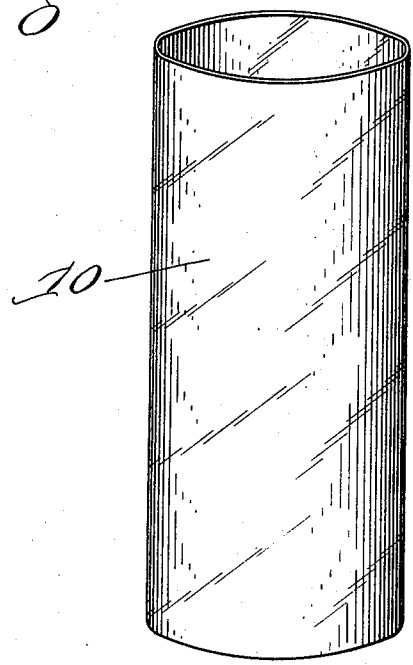
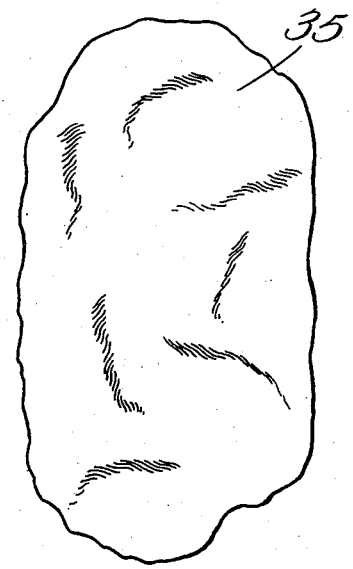
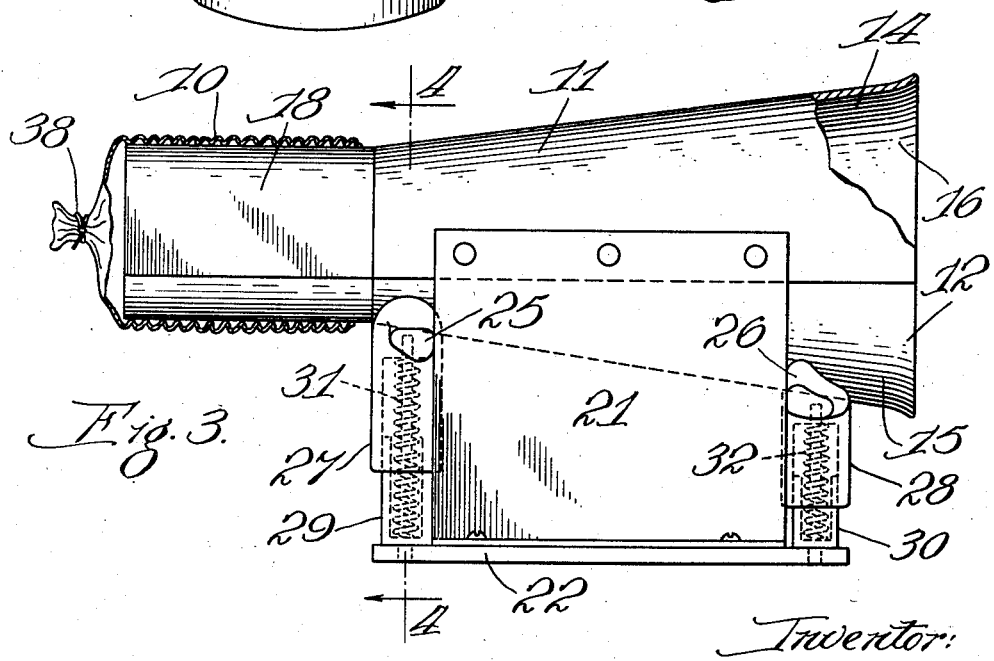

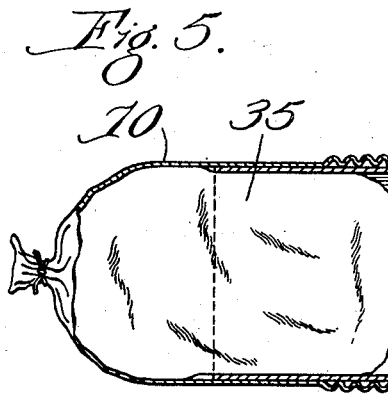
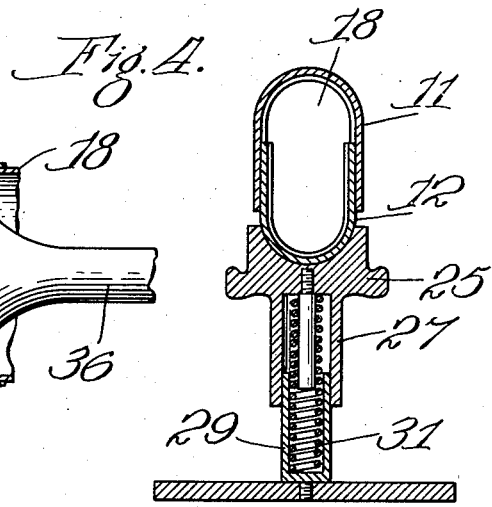
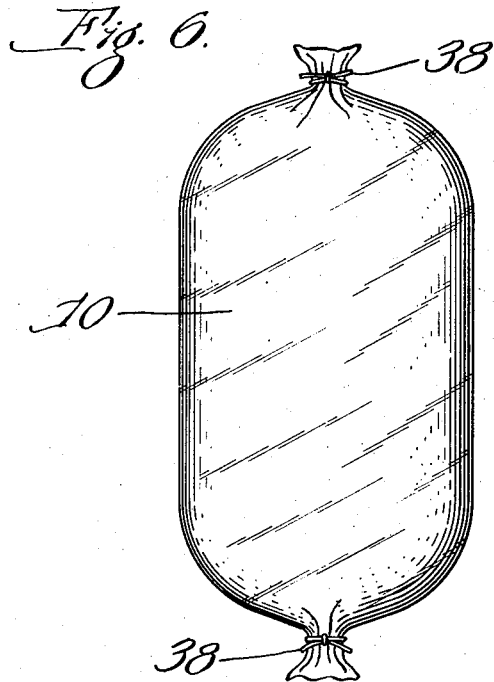
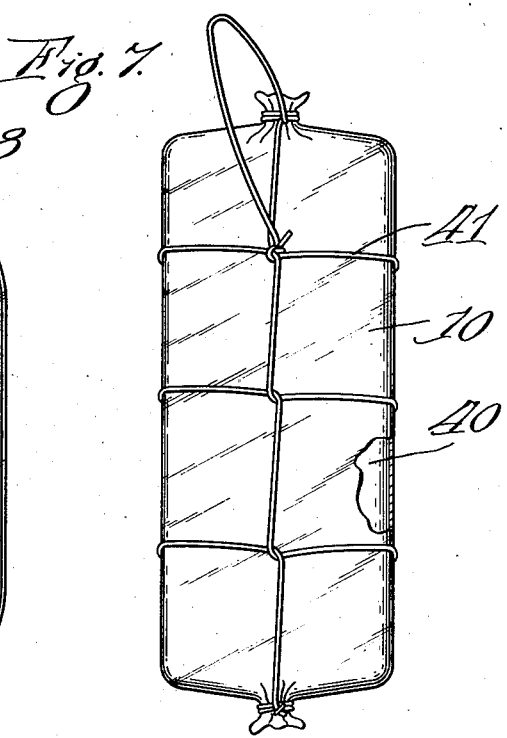

Patented July 21, 1936

2,048,447

UNITED STATES PATENT OFFICE 2,048,447

PACKAGED MEAT CUT AND METHOD OF PREPARING IT

Alfred G. Hewitt, La Grange, Ill., assignor to The Visking Corporation, a corporation of Virginia Application January 15, 1934, Serial No. 706,730

5 Claims. (Cl. 99—174)

The invention relates to packaged meat cuts, such as packaged butts, Canadian bacon, etc., and a method of producing them. This application is a continuation in part of my co-pending application, S. N. 519,142, filed February 28, 1931.

The improved method is preferably practiced by inserting a previously cured meat cut in a seamless tubular casing formed from cellulose, or a compound thereof, the casing being first moistened and expanded so that it will fit snugly on the meat cut. The meat cuts are preferably of somewhat regular form i. e., the meat cuts are preferably substantially constant in cross section throughout a relatively large part of their lengths. But relatively short meat cuts may be employed having a somewhat egg-like shape if it is so desired.

The meat cuts are preferably forced through a stuffing horn, or the equivalent, into the expanded tubes or casings, the horn being preferably of such construction that it tends to compress the meat cuts and to smooth the outer surfaces thereof so that the packaged meat cuts will have a neat, smooth appearance.

After the meat cuts have been prepared as described above, they are subjected to the usual smoking operation. During the smoking operation the cellulose covering shrinks upon the meat cut and conforms to the shape thereof so that it forms a closely fitted container therefor and may be left thereon when the meat is sold to the customer. If the meat is to be boiled, it is preferably boiled in its cellulose container.

Smoked meats prepared by practicing the improved method have a pleasing and appetizing appearance and the loss of weight which accompanies the smoking operation is small as compared with the loss of weight which usually accompanies the smoking process as it has been practiced heretofore. The usual tough and bitter rind which is found on smoked meats is absent when the improved cellulose container is employed as described above. The container is preferably transparent and when the improved method is practiced, the meat cut has a very pleasing color which is visible through the transparent container.

Other advantages of the invention will become apparent as the following detailed description progresses, reference being had to the accompanying drawings, wherein Fig. 1 is a perspective view of a length of seamless tubing as it appears before the meat is inserted therein.

Fig. 2 is an elevation of a meat cut suitable for insertion in the cellulose tubing shown in Fig. 1.

Fig. 3 is a side elevation of apparatus for stuffing meat cuts into cellulose tubing.

Fig. 4 is a section taken on line 4—4 of Fig. 3.

Fig. 5 is a fragmentary section through a stuffing horn which forms part of the apparatus shown in Fig. 3, a meat cut and a length of cellulose tubing being shown with the horn.

Fig. 6 is an elevation of the meat cut shown in Fig. 2 as it appears after it has been packaged in the cellulose container shown in Fig. 1, and Fig. 7 is an elevation of a slab of bacon packaged in a length of seamless cellulose tubing.

To facilitate the detailed disclosure of this invention, it is best to state that meat cuts are smoked to preserve them and to give them an appetizing color and a pleasing flavor. Usually the meat cuts are first cured. Among the meat cuts commonly smoked are sweet-pickle and dry-salt hams, shoulders, clear and rib bellies, rib backs, loins and boneless butts. The usual procedure is to cure these cuts, soak them for a short time in water, and then wash and trim them if that is necessary. The meat cuts are then smoked, after which they are wiped and wrapped for delivery. At the present time, such cuts are usually smoked without coverings or protection, although they are sometimes covered with an open mesh, woven or knitted bag during the smoking process.

Among the disadvantages of the present method of smoking meat cuts, the following may be mentioned. A considerable shrinkage or loss of weight occurs during the smoking operation and this shrinkage continues after the smoking operation. This loss of weight frequently reaches or exceeds 15% of the initial weight and is accompanied by the drying up of meat juices, causing loss of flavor and causing the meat to become tough. The smoked meats also have a dry, tough rind which is bitter to the taste and must be removed; this represents a loss. The appearance of the final product is usually unappetizing as it looks dark, greasy and dirty. However, as stated above, the interior of the smoked meat has an appetizing color.

In practicing the improved method, to produce smoked meat cuts, seamless tubing formed of cellulose is employed as the container for the meat during the smoking process. This seamless cellulose tubing or casing is preferably formed from a viscose or solution of cellulose xanthate which may be obtained by practicing the method briefly described in U. S. Letters Patent No. 1,612,508 granted to William F. Henderson and Harold E. Dietrich December 28, 1926. This viscose is extruded through an annular orifice to form the seamless tubing which is then subjected to coagulating and regenerating baths. The excess coagulating and regenerating liquids are washed from the tubing and it is then treated with a softening agent, preferably glycerine. The tubing is wet when it leaves the glycerine bath and may be employed in this condition in practicing the present invention, if it is so desired, although in most instances it is preferable to dry the tubing after it has been subjected to the glycerine bath.

One reason for using cellulose tubing which has been dried after being subjected to the softening agent is that the film forming the tubing is stronger than the film of tubing which has not been dried. Another reason for utilizing dry tubing is that data can be printed much more readily on the dried tubing. In the practice of the improved method, the dry tubing is wet with water before the meat cut is inserted therein.

In practicing the invention, the previously cured meat cuts are washed and drained if necessary and are then inserted in seamless tubes formed of cellulose or a compound thereof, one of these tubes being shown in perspective in Fig. 1 of the drawings and being identified by the reference character 10.

The tubing employed is preferably smaller in diameter than the meat cut so that it must be stretched or expanded when the meat cut is inserted therein. The diameter of the meat may be reduced in a press, or the equivalent, and inserted in the tubing in its compressed condition so that it will subsequently expand and stretch or expand the tubing which is in a wet condition. In practice, the meat is preferably extruded from a stuffing horn directly into the tubing.

The thickness of the tubing will be determined by the strength that is required. Large and heavy cuts which must be supported by the covering will require a relatively thick walled tubing. For example, it has been found that for meat cuts weighing 5 to 8 pounds, a tube 3¾ inches in diameter and having a wall of .003 to .004 inch thick when dry, gives satisfactory results. Such a cover will support the meat suspended in it during the smoking operation. If the meat is placed in a tray during the smoking operation, or suspended in a cradle of string, a thinner walled tubing can be used.

Seamless cellulose tubing formed by extrusion as described above may be expanded or stretched laterally a relatively large amount without failure thereof. Thus, if a piece of dry tubing is moistened, it may be expanded or stretched laterally to increase its diameter about 75% before it tears. In practice, the tubing is generally not expanded or stretched laterally more than 33⅓% of its diameter. When the tubing is dried during the smoking operation it tends to shrink and where the meat is somewhat irregular in shape and a portion of it is of less diameter than the expanded tubing, the tubing will shrink to conform to the shape of the meat unless it is very irregular in shape. In tubing having a larger diameter than the meat employed, the tubing must shrink to the size of the meat and this may result in a wrinkled container for the meat, the container generally having air, fat or water pockets. Also, tubing which is larger than the meat cut and is not stretched laterally or expanded when the meat is inserted therein, does not adhere to the meat sufficiently to give the packaged meat cut a pleasing appearance. If too large a tubing is employed, the container and meat separate when the packaged cut dries and it loses much of its pleasing appearance.

In Figs. 3, 4 and 5, apparatus is shown for stuffing meat cuts into cellulose tubing. This apparatus does not form a part of this invention and is more fully shown and described in the copending application, S. N. 626,965 filed July 30, 1932 by John Paul Smith. Briefly, the stuffing apparatus comprises an upper section 11 and a lower section 12, the side walls of the sections being in slidable engagement with each other so that the lower section 12 may be displaced (depressed) in a vertical direction relative to the upper section 11. The sections 11 and 12 are preferably formed from sheet metal and preferably comprise tapered portions 14 and 15, respectively, which provide a large opening 16 at one end. The discharge ends of the sections 11 and 12 form a tubular portion or horn 18 over which the tubing 10 may be shirred as illustrated in Figs. 3 and 5. The upper section 11 is rigidly secured to a pair of bracket plates 21 which are secured to a base plate 22. The lower section 12 is secured to heads 25 and 26 formed integral with plungers 27 and 28, respectively, which are slidably journaled on tubular members 29 and 30, respectively, fixed to the base 22. A spring 31 is interposed between the head 25 and the bottom end of the tubular member 29. A similar spring 32 is interposed between the head 26 and the bottom end of the tubular member 30. The construction is such that the springs 31 and 32 yieldably urge the lower section 12 in an upward direction.

When a meat cut such as is shown at 35 in Fig. 2 is inserted into the large end of the stuffing device shown in Figs. 3, 4 and 5, it may be forced through the stuffing horn 18 by means of a stick or ram 36. This operation is illustrated in Fig. 5. Power operated rams are used to a large extent and it is obvious that the pressure to which the meat is subjected compresses it and makes it conform to a large extent to the shape of the horn. In practicing the improved invention, the meat is of such size or diameter that the stuffing horn 18 must expand against the action of the springs 31 and 32 when the meat cut 35 is forced through the stuffing horn 18. The meat cut should not cause the stuffing horn to expand the shirred casing 10 more than 33⅓% of its diameter. Preferably, the shirred casing or tubing 10 is expanded more than 10% of its diameter, although a small degree of expansion will give good results. It is essential, however, that in practicing the preferred form of the improved method, the casing should be expanded so that it will not wrinkle when it dries upon the meat cut. It may be mentioned at this point that longer horns are used for the longer meat cuts.

As illustrated in Fig. 3, the wet tubing or container 10 is shirred upon the horn 18. The outer end of the container may be tied before or after it is placed in the horn. Then, as illustrated in Fig. 5, the meat cut 36 is forced through the horn 18 and as it passes from the horn 18, it draws the shirred container 10 over it. After the meat cut 35 has been forced into the container 10, the other end of the container is tied so that the completed package appears substantially as illustrated in Fig. 6 wherein the tied ends are shown at 38. The meat cut is then subjected to the smoking operation and during this operation, the container dries and shrinks where the meat does not prevent such shrinkage. In fact, the tubular container becomes closely consolidated with the surface of the meat cut, forming a closely adhering skin-like covering therefor. As explained above, if the wet container has been expanded to receive the meat cut, it will not wrinkle when it dries over the smaller portions of the meat. Of course, the tied ends of the container will be wrinkled, but substantially all of the meat will be visible through the casing if it is transparent in accordance with the preferred practice. The smoked meat cut has an extremely pleasing appearance as distinguished from meat cuts which have been smoked by practicing the usual methods. The color of the improved packaged meat cut appears bright and clear to the purchaser.

It has been ascertained that when the improved method is employed to produce smoked meats, the usual shrinkage or loss in weight is reduced, usually to less than half in the case of fat meats.

It will be readily understood that the cellulose tubing prevents the deposit on the meat of bitter compounds from the smoke and makes it unnecessary to dry out or "crisp" the outer surface of the meat. Hence, there is no waste of meat. The consumer need only to peel off the tubing to leave a tender, edible surface of meat below it.

The flavor of meats smoked in the improved covering is much improved because nearly all of the juices are retained, the only loss being a loss of water and this loss is smaller than the loss of water through a natural or animal casing. Also, nothing but water can pass through the improved container while fat passes through natural or animal casings including animal bladders. When smoked meats are subsequently boiled in the covering, it is obvious that the juices of the meat are retained during the boiling operation and an improved flavor results.

An important feature of the invention is that the cellulose container is non-putrescible. It is exceedingly sanitary and protects the meat against contamination from handling, insects and contact with other objects.

While the thin continuous film which I have provided for covering smoked meats is preferably formed from regenerated cellulose, it is understood by those skilled in the art that the film may also be described as one containing cellulose hydrate, particularly when the film is in a wet state. I also contemplate the use of a cellulose ester, such as cellulose acetate, to produce films of the character and for the purpose set forth.

In the appended claims, the phrase "plastic cellulose compound" is employed to define a class of substances which includes cellulose, cellulose hydrate and cellulose ester.

In Fig. 7, a slab 40 of bacon is shown in a seamless cellulose tube 10, the tube 10 having been expanded while wet before the bacon was inserted therein. The ends of the tubing are tied and it is provided with a cradle 41 of string whereby the package may be suspended during the smoking operation.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

I claim:

1. A method of preparing a smoked meat cut, which method comprises expanding a wet seamless tube derived from plastic cellulose compound, compressing the cut and simultaneously inserting it in said expanded tube to fit snugly therein, closing the ends of the tube, and smoking the cut while it is thus enclosed.

2. A method of preparing a smoked meat cut, which method comprises forming a seamless tube from a plastic cellulose compound, drying the tube, wetting the tube, expanding the tube while it is wet, compressing said cut and simultaneously inserting it in said expanded tube, and smoking the cut while it is thus enclosed.

3. A method of preparing a smoked meat cut which comprises stretching and diametrically expanding, while in wet condition, a seamless tube derived from a cellulose derivative, and introducing the meat cut into said tube while the tube is in stretched and expanded condition, and smoking the meat cut while enclosed within said tube, whereby the elastic properties of the meat cut and the tube will maintain a constant firm contact between the meat cut and the tube.

4. A method of preparing a meat cut which comprises stretching and diametrically expanding, while in wet condition, a seamless tube derived from a cellulose derivative, said tube having one end closed and secured in closed condition, introducing the meat cut into the stretched expanded tube through the open end thereof, closing and securing the open end of the tube, and subjecting the tube and the enclosed meat cut to a smoking operation.

5. A method of preparing a meat cut which comprises stretching and diametrically expanding, while in wet condition, a seamless tube derived from a cellulose derivative, introducing the meat cut, while under laterally applied compression, into the stretched expanded tube, and smoking the meat cut thus enclosed, whereby the compressive action of the tube and the expansive action of the meat cut will maintain a firm contact between the meat cut and the tube.

ALFRED G. HEWITT.